(12) United States Patent
Sejourne

(10) Patent No.: US 8,820,506 B2
(45) Date of Patent: Sep. 2, 2014

(54) TIME DELAY SEPARATOR

(75) Inventor: Jerome Sejourne, Saint-Diery (FR)

(73) Assignee: Interroll Holding AG (CH)

( * ) Notice: Subject to any disclaimer, the term of this patent is extended or adjusted under 35 U.S.C. 154(b) by 36 days.

(21) Appl. No.: 13/455,765

(22) Filed: Apr. 25, 2012

(65) Prior Publication Data

US 2012/0273325 A1 Nov. 1, 2012

(30) Foreign Application Priority Data

Apr. 26, 2011 (EP) .................................... 11290200

(51) Int. Cl.
*B65G 13/075* (2006.01)

(52) U.S. Cl.
USPC ...................... 193/35 A; 198/459.6

(58) Field of Classification Search
USPC ............... 198/781.05, 781.06, 781.09, 418.7, 198/418.9, 459.6; 193/35 A, 35 G, 35 R
See application file for complete search history.

(56) References Cited

U.S. PATENT DOCUMENTS

| | | | |
|---|---|---|---|
| 3,777,867 A * | 12/1973 | Durwald ..................... | 193/35 A |
| 4,392,568 A * | 7/1983 | Turnbough et al. ...... | 198/781.06 |
| 4,809,836 A * | 3/1989 | Zilber ......................... | 193/35 A |
| 5,042,644 A * | 8/1991 | Davis .......................... | 198/781.1 |
| 5,213,189 A * | 5/1993 | Agnoff ........................ | 193/35 A |
| 5,890,577 A * | 4/1999 | Faisant ........................ | 193/35 A |
| 6,189,672 B1* | 2/2001 | Schut .......................... | 193/35 A |
| 6,234,292 B1* | 5/2001 | Schut .......................... | 193/35 A |
| 6,523,671 B2* | 2/2003 | McTaggart et al. ........ | 198/459.6 |
| 6,848,567 B2* | 2/2005 | Kilper et al. ............... | 198/460.1 |
| 7,198,146 B2* | 4/2007 | Guidetti ....................... | 198/428 |
| 7,565,960 B2* | 7/2009 | Worner et al. ............. | 198/459.6 |

FOREIGN PATENT DOCUMENTS

| | | |
|---|---|---|
| DE | 31 29 318 | 2/1983 |
| DE | 196 36 842 | 3/1997 |
| EP | 0 164 527 | 4/1985 |
| EP | 1 484 265 | 4/2004 |
| FR | 2 729 936 | 1/1995 |

* cited by examiner

*Primary Examiner* — Ramya Burgess
*Assistant Examiner* — Thomas Randazzo
(74) *Attorney, Agent, or Firm* — Gerald E. Hespos; Michael J. Porco; Matthew T. Hespos

(57) ABSTRACT

A separator device for a conveyor has a stop (12) arranged to be moved between a separating position and a conveying position, a trigger (11) arranged to move the stop (12) into the separating position when triggered, and a delayer (20) arranged to delay a movement of the stop (12) from the separating position into the conveying position. The delayer (20) has an energy storage arranged to gain energy when the trigger (11) is triggered. The energy storage is arranged to power a rotary drive impeding the stop (12) from moving into the conveying position.

16 Claims, 3 Drawing Sheets

TIME DELAY SEPARATOR

BACKGROUND OF THE INVENTION

1. Field of the Invention

The invention relates to a separator device for a conveyor and to a conveyor.

2. Description of the Related Art

Conveyors are commonly used for the storage of pallets or boxes in gravity or dynamic storage. Dynamic storage facilities are made of chutes fitted with rollers or cylinders mounted parallel to one another on beams forming a frame which is tilted from its upstream to its downstream section. These rollers and/or cylinders determine a raceway on which the loads, generally handling pallets, are placed for storage.

In order to suppress the problems associated with the extraction of the loads located at the lower portion of the storage chute, and notably that of the pressure exerted onto the end load by the accumulation of the upstream loads, a load separator device is commonly used at the level of the downstream end of the chute. This device is suited to isolate at least the first load, located downstream on the facility, with respect to the other loads which are waiting upstream, in order to allow smooth extraction of this first load, without causing any problems, using for instance a fork lift.

These separator devices comprise a pedal and a stop, interconnected by a pole or a tie shaped linking rod as coupling. The pedal has been accommodated at the end of the chute and is designed to be actuated by the downstream load. The stop is used to retain the upstream loads in order to separate them from the load located at the downstream end. This stop is brought into active separating position by the pedal when the latter is actuated by the end downstream load and it is deactuated when said downstream load is removed. The removal allows the following load take its place at the end of the chute and actuates, in turn, the pedal as well as the retaining stop for the other loads.

Moreover, to provide greater safety when handling the load removed downstream of the chute, it may be beneficial to retain the upstream loads, to give time to the operator to remove the downstream load without being affected by the pressure of the other loads on the chute. In this view, the load separation devices can be fitted with means enabling to prevent an early release of the barrier when removing the downstream load.

The document FR 2 729 936 shows the possibility of using such means that retain the stop during a given time after the separator pedal is activated. The pallet separator includes a delay device in the form of a controlled leak jack whose rod stroke extends from a delay start position to a delay end position. The jack is capable of maintaining the stop in an active position for sufficient time to allow removal and handling of the downstream load before arrival of the next load at the end of the chute. A delay member consists of a leak type hydraulic jack, arranged under the separator stop comprising a cylindrical body enclosing a mobile plunger which separates the cylindrical body into two chambers filled with oil. When the separator stop is activated, the mobile plunger slides into the cylindrical body pushing oil into the upper chamber. A spring pushes the plunger back out of the cylindrical body against the pressure of the oil. The separator stop is pushed into its separating position by the plunger. This return into the separating position is slowed by the oil.

It is an object of the invention to provide an alternative and improved separator device for a conveyor.

SUMMARY OF THE INVENTION

According to one aspect of the invention, a separator device for a conveyor comprises a stop that is arranged to be moved between a separating position and a conveying position. In the separating position, the stop isolates at least the first downstream load, holding back the other loads. In the conveying position the stop allows all loads to pass. The separator device further comprises a trigger that is arranged to move the stop into the separating position when triggered. The trigger can for example be a pedal that is triggered by the weight of a load placed on the pedal. The separator device further comprises a delayer that delays a movement of the stop from the separating position into the conveying position in order to allow smooth extraction of the (first) load that triggered the trigger.

The delayer comprises an energy storage that gains energy when the trigger is triggered. The energy storage is arranged to power a rotary drive that is impeding the stop from moving into the conveying position.

The stop of the separator device can be a barrier or abutment that stops the loads by being arranged in their path when in the separating position.

The rotary drive drives an axle. The moment of the axle is used to drive and control the delayer.

Rotary drives are commonly known so they provide an approved way of driving a device. They also provide a better control of the delayer, since rotary drives can drive devices more exactly than linear drives with dampening elements like oil, and they are less vulnerable to signs of wear than drives that depend on the viscosity of fluids that can change over time, especially when exposed to air and pollution by dirt particles.

The stop being movable between the separating position and the conveying position means that it can be switched/moved from one position into the other and back.

In an aspect of the invention, the delayer comprises a restrainer delaying the decrease of the energy in the energy storage. This elongates a time span during which the rotary drive is powered by the energy storage and impeding the stop from moving into the conveying position. The restrainer can be a dampening element, an escapement, or an inertia element. Restraining the energy in the energy storage has the advantage to elongate the time during which the stop is in its separating position and therefore providing enough time to unload the downstream load.

According to an embodiment of the invention, the delayer comprises a clockwork. The clockwork itself comprises an escapement as restrainer, the energy storage and the rotary drive. Clockworks are commonly known and provide a reliable element of the device. Another advantage of the use of a clockwork is that a time during which the stop is restrained in the separating position can be adjusted more directly than by choosing a suiting dampening elements. The delaying time of dampening elements or similar delayers is usually fine tuned by trial and error rather than by a direct input of the delaying time as can be done when using a clockwork controlling the delaying time.

Advantageously, the delaying time of the clockwork is adjustable so that it can vary depending on the loads to be stored/transported.

Clockworks like mechanical timers are commonly used in watches. Mechanical watches are stable in a high temperature range from −30° C. to +45° C. The separator device, and especially its delayer, is compact and can be easily integrated in standard dynamic storage lanes.

In an embodiment of the invention, the trigger and/or the stop comprises an actuator delivering the energy to the energy storage when the trigger is triggered. The actuator is then winding up the energy storage and thus loading it by an amount of energy. The triggering of the trigger is usually accomplished by a load moving on a pedal, the pedal working as the trigger. Thus, the weight of the load presses down the pedal and this pressure is used to wind up the energy storage. The actuator can have the form of a nose or a protrusion that winds up the energy storage when triggered.

According to an embodiment of the invention, the separator device comprises a release mechanism with a pivoting lock arranged to switch from a locking position (in which it impedes the stop) into a release position (in which it releases the stop into its conveying position). The locking position of the pivoting lock corresponds with the separating position of the stop. The release position of the pivoting lock corresponds to the conveying position of the stop. While the pivoting lock can switch from the locking position to the release position and back, it can also be arranged in other positions between the locking and the release position. A pivoting lock pivots about an axle. The use of a pivoting lock in combination with a rotary drive provides a very effective power transmission, since both elements can be rotated.

The pivoting lock can be arranged to switch from the locking position into the release position when the energy stored in the energy storage is decreased to less than 30%, in particular to less than 10% of the amount it gains when triggered be the trigger. That means, when most of the energy in the energy storage is spent, the pivoting lock will release the stop of the separator device into the conveying position. The delayer is only restraining the stop from moving into the conveying position as long as the energy storage is powering the rotary drive.

According to an embodiment of the invention, the release mechanism comprises an opening, the opening being arranged to accommodate the actuator when the trigger is triggered. The opening holds the actuator engaged into the release mechanism and therefore restrains the stop from moving into the conveying position. Since the actuator is a part of the trigger and/or the stop (or coupled to it/them), the fixation of the actuator in the opening not only restrains the actuator from moving, but also the stop coupled to the actuator.

The opening can be part of the pivoting lock. For example, the pivoting lock can be U-shaped, wherein the actuator is arranged to engage the U-shaped opening of the pivoting lock. An U-shaped pivoting lock not only provides the opening for the actuator, but also provides the two flanks of the U which can be used to hold, to move, and/or to interact with different parts of the separator device or the delayer.

In an embodiment, the actuator is arranged to switch the pivoting lock into the locking position when the trigger is triggered. The actuator is mechanically transmitting a force delivered to the trigger by a load to pivot the pivoting lock into the locking position.

In an embodiment of the invention, the delayer comprises a pointer driven by the rotary drive so that the rotary drive drives the angular position of the pointer. The pointer can for example be the pointer of a clockwork. The pointer is arranged so that it can transmit a force to the pivoting lock such that it is switching the pivoting lock into the release position and/or the locking position depending on the angular position of the pointer. The rotary drive controls the angular position of the pointer, the angular position of the pointer controls the position of the pivoting lock, and the position of the separator stop depends on the position of the pivoting lock.

The pointer can be arranged to deliver a force to the release mechanism by engaging the opening of the release mechanism that can also accommodate the actuator. In this embodiment, both the pointer and the actuator engage the same opening of the release mechanism. This enables also a possible interaction of the pointer and the actuator, since they are both arranged in the same area. One possible interaction is that the actuator, when the trigger is triggered, can circularly move the pointer so that a force is delivered to the rotary drive, thereby winding up the energy storage that powers the rotary drive. In this embodiment, the actuator is movable between a position outside of the opening and a position inside the opening. So depending on its position, the actuator is only engaging the opening when the trigger is triggered, but leaves the opening when freed and the trigger is in its active position, waiting for a load to trigger it.

In an embodiment of the invention, the separator device comprises a spring to deliver a force to move the stop of the separator device into the conveying position. This movement can be impeded by the delayer. Advantageously, the force of the spring is decoupled from the rotary drive. This can be accomplished via the pivoting lock. With the rotary drive only being responsible for the functioning of the release mechanism while being independent of the force originating from the spring, the forces delivered by the rotary drive can have a lower value than the forces originating from the spring. Thus, a relatively weak rotary drive can be used for the separator device, since it is decoupled from the force moving the separator stop and the trigger itself. Decoupled means that the lines of the corresponding forces are either substantially orthogonal or separated so they do not interact.

The achievement of the object of the invention is also set out by a conveyor according to claim 15. The conveyor for conveying goods and/or loads comprises a separator device according to any of the preceding claims, wherein the stop of the separator device is arranged to stop goods and/or loads from being conveyed when it is in the separating position.

In the following, the subject-matter will be described by way of example without limitation of the general inventive concept, with the aid of embodiments with reference to the drawings to which attention is drawn concerning the disclosure of all details of the invention not described more explicitly in the text. Some features shown in the different embodiments can used in the implementations shown in other embodiments. Same reference signs used in the figures show similar features in the embodiments.

DETAILED DESCRIPTION OF THE PREFERRED EMBODIMENTS

Figure 1A:
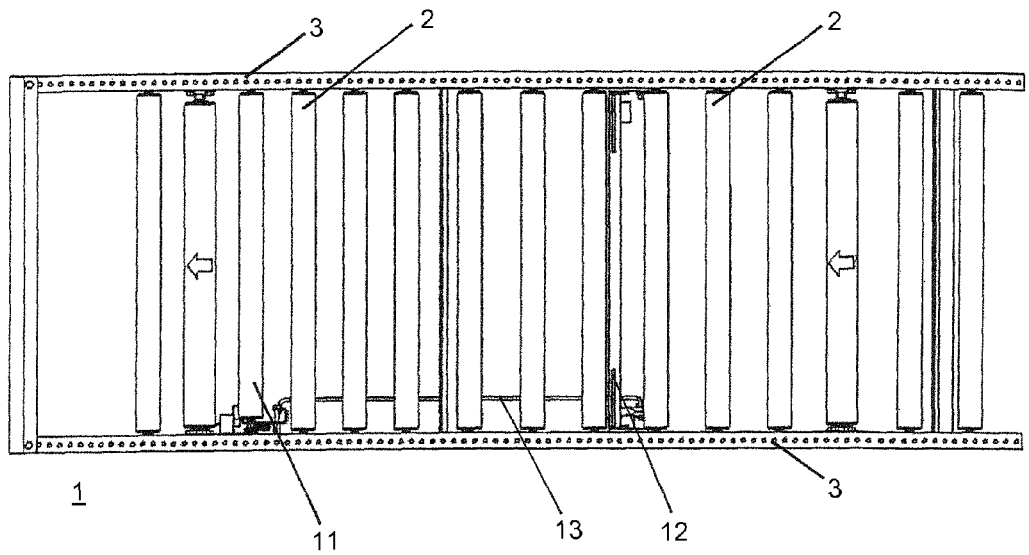
FIG. 1A is a diagrammatic top-view of a possible embodiment of the separator device implemented in a conveyor.

FIG. 1A shows a diagrammatic top-view of a conveyor 1 that can be used as storage chute in dynamic storage facilities. Two beams 3 are arranged parallel to each other in a direction in which loads or goods can be transported. The beams 3 form a frame and the side boundary of the conveyor 1 and comprise a fixed position. Multiple rollers or cylinders 2 are arranged substantially perpendicular to the beams 3 to carry and transport goods or loads (goods and loads not shown). The rollers 2 are mounted rotatable about their axes to transport the loads.

Some of the rollers 2 (in FIG. 1A the rollers marked with an arrow) are driven by an engine (not shown) to rotate around their axes, thus, moving the loads downstream on the conveyor.

FIG. 1A also shows parts of a separator device 10, especially a pedal 11 as the trigger of the separator device, a separator stop 12, and a coupling 13 to couple the trigger 11 with the stop 12. The trigger 11 consists of a single roller similar to the rollers 2 of the conveyor 1. The trigger 11 is arranged substantially parallel to the rollers 2 and substantially perpendicular to the beams 3. The stop 12 has the form of a plate or a wall arranged substantially parallel to the rollers 2.

Figure 1B:
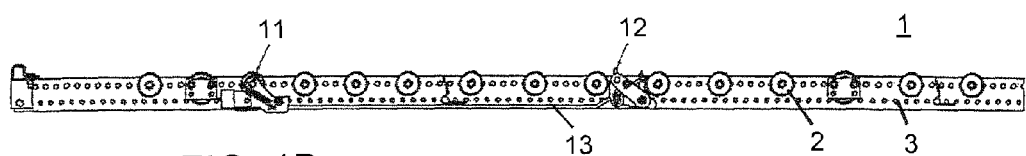
FIG. 1B is a diagrammatic side-view on the conveyor with the separator device of FIG. 1A.

FIG. 1B shows a diagrammatic side-view on the conveyor 1 shown in FIG. 1A. One of the beams 3 is not shown in FIG. 1B to offer a better view on the rollers 2 and the parts of the separator device. The trigger 11 in form of a pedal roller is shown in a position in which it is arranged at level with the rollers 2. Via the coupling 13 in form of a pole, a stiff wire, or a tie-shaped linking rod, the trigger 11 is coupled to the stop 12 arranged in a conveying position. In the conveying position, the stop 12 is arranged level with the rollers 2 of the conveyor 1.

The trigger 11 comprises spring means (shown as 15 in FIG. 3B) arranged to push the trigger 11 in a direction perpendicular to both the conveying direction and the direction in that the axes of the rollers 2 are arranged. FIG. 1B shows that the cylinder mantle of the rollers 2 protrude over the top of the beams 3. The top sides of the cylinder mantles of the rollers 2 form a conveying surface for the loads to be conveyed upon.

The trigger 11 is movable so that it can protrude into the conveying surface formed by the cylinder mantles of the rollers 2. A load moving down the conveyor arriving at the position of the trigger 11 may move on top of it and press it down to hold it level with the other rollers 2. This is the position shown in FIG. 1B. The weight of the load applies a pressure on the trigger 11 pressing it down. The trigger 11 is mounted pivotably around an axle (shown as 17 in FIG. 3A) so that by being moved level with the other rollers 2, the trigger 11 pushes the coupling 13 against the conveying direction. The coupling 13 pushes one end of the also pivotable mounted stop 12 against the conveying direction and by that moving the stop 12 out of its conveying position into its separating position.

The coupling 13 transfers a movement of the trigger pedal 11 to the separator stop 12.

In the separating position, the stop 12 protrudes into the conveying surface formed by the cylinder mantles of the rollers 2 and prevents loads positioned upstream from passing the position of the stop 12.

Figure 2:
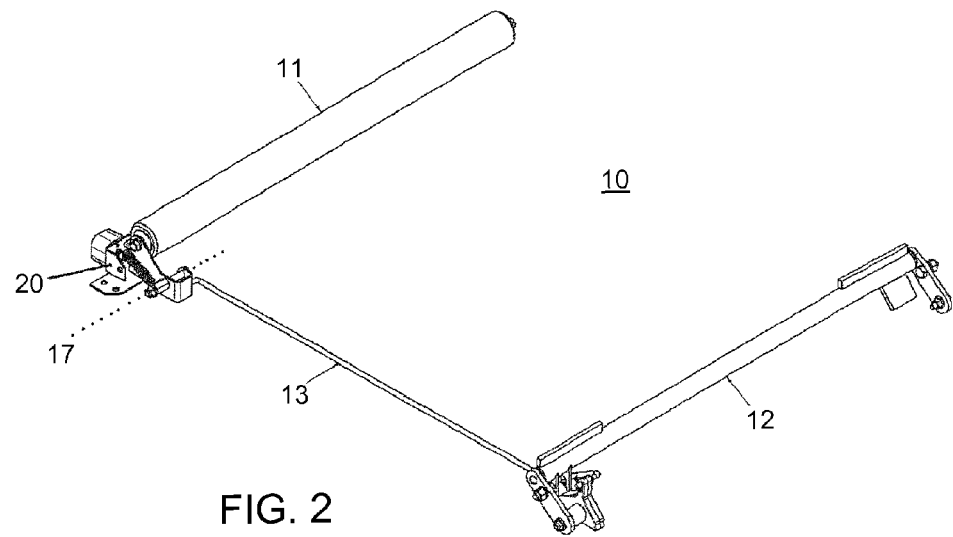
FIG. 2 is a perspective diagram of a separator device.

FIG. 2 shows a diagram of a perspective view of a separator device 10. It shows the trigger 11 in form of a pedal roller, the stop 12 in form of a plate, and the coupling 13 couples the trigger 11 to the stop 12. A delayer 20 is arranged on the side-end of the trigger 11 upon which the coupling 13 is connected. This delayer 20 is shown more closely in the following figures. The trigger 11 is a pedal that has the function to unlock and/or release the separator stop 12.

Figure 3A:
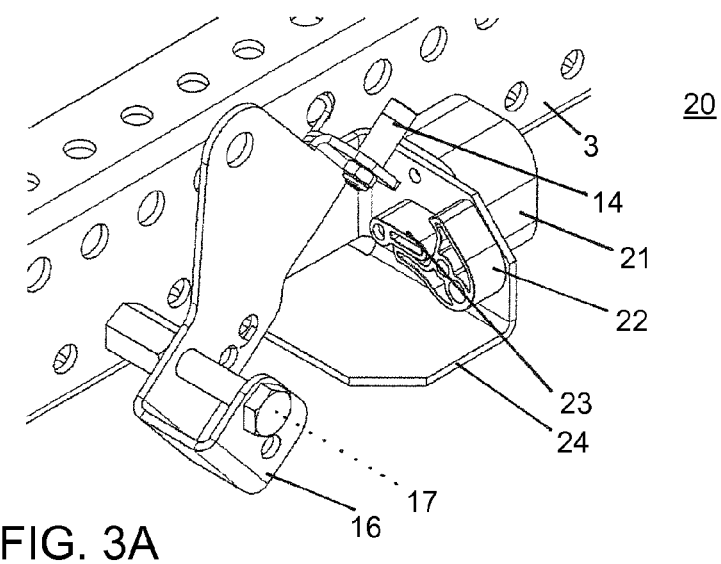
FIG. 3A is a perspective diagram of a delayer in release position.
Figure 3B:
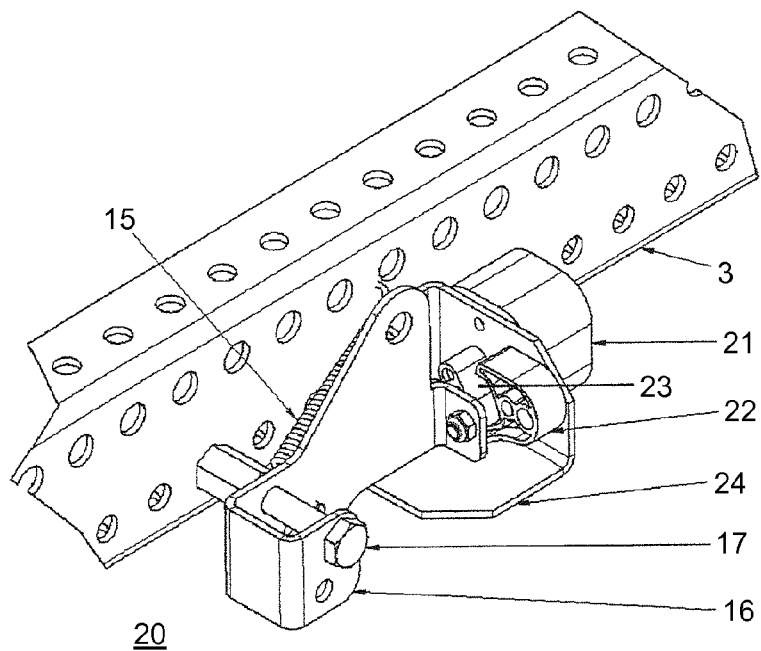
FIG. 3B is a perspective diagram of the delayer shown in FIG. 3A in locking position.

FIG. 3A shows a perspective diagram of the delayer 20 in a release position, while FIG. 3B shows the delayer 20 shown in FIG. 3A in a locking position.

FIGS. 3A and 3B show an axle 17 around which the trigger 11 (see also FIGS. 1A, 1B, and 2) is pivoted when triggered. Mounted to the axle 17 is a pedal 16 arranged pointing away from the axle 17. One end of the pedal 16 is fixed with the axle 17, while the far end of the pedal 16 comprises an actuator 14 in form of a nose fixed to the far end of the pedal 16. The far end is the end pointing away from the axle 17 about which the trigger 11 is pivotable. When the trigger 11 is pushed down by a load and rotates around its axle 17, the pedal 16 is rotated in a way that its far end will move the most, and with it will the actuator 14.

In the embodiment shown in the FIGS. 3A and 3B, the delayer 20 is arranged near the pivoting axle 17 of the trigger 11. In an alternative embodiment, it is also possible to arrange the delayer 20 at the stop 12 or even at the coupling 13.

Since conveyors usually comprise a conveying direction that is substantially horizontal, and the loads of it are arranged on top of it, the directions up and down can be defined. Up is the direction from which the weight of loads presses on the conveyor 1, while down is the direction from which the conveyor 1 is supported by the ground.

When the trigger 11 is triggered, the actuator 14 moves down. While the stop 12 is in its conveying position, the actuator 14 is contact free from other parts of the delayer 20, except from the pedal 16 to which it is mounted.

The delayer 20 comprises a clockwork 21, a pivoting lock 22, a bracket 24, and a pointer 23. By the bracket 24 the clockwork 21, the pivoting lock 22 and the pointer 23 are mounted to one of the beams 3. The clockwork 21 is fixed in its position relative to the beams 3. The clockwork 21 can be a regular egg timer and forms a compact component of the delayer 20. The clockwork 21 comprises an energy storage for example in form of a spring or weights that can be pulled up over an axle. The clockwork 21 further comprises a rotary drive connected to the energy storage that drives the pointer 23. An escapement of the clockwork 21 forms a restrainer delaying the decrease of the energy in the energy storage of the clockwork 21 as it is commonly done in clockworks.

The clockwork 21 used for the separator device 10 consists of a mechanical clockwork. It is possible to use an electromechanical clockwork to drive the pointer 23, but a mechanical clockwork is preferred because a mechanical clockwork does not require any batteries or another electrical power supply.

Like the pointer of a watch, the pointer 23 rotates around an axle when the rotary drive of the clockwork 21 has enough energy to drive the pointer 23.

The pivoting lock 22 is formed as U, comprising an opening and two flanks.

In FIG. 3A the pointer 23 points into the opening of the pivoting lock 22 in its release position. The opening of the pivoting lock 22 points towards the actuator 14.

When the trigger 11 is triggered (FIG. 3B), the actuator 14 moves (downwards) toward the opening of the pivoting lock 22. In the locking position of the pivoting lock 22, the actuator 14 engages the opening of the pivoting lock 22 together with the pointer 23.

FIG. 3B also shows the spring 15 that is stretching from the axle 17 to one of the beams 3. Thus, the spring 15 is mounted with one end to a part of the separator device 10 that is shifted when the trigger 11 is triggered, and mounted with another end to a fixed part of the conveyor 1. The spring 15 is deformed when a load triggers the trigger 11. While the trigger 11 is triggered, and the separator stop 12 is in separating position, the deformation of the spring 15 causes a moment on the axle 17, trying to pivot the trigger pedal 11 back into its active position.

FIGS. 4A to 4E show a diagrammatic side view on the delayer 20 and its function. The FIGS. 4A to 4E are a view in conveying direction of the goods. The bracket 24 is mounted from the side on the beam 3 of the conveyor 1. On one side of the bracket 24, the clockwork 21 is mounted. On the other side of the bracket 24, the pointer 23 and the pivoting lock 22 are mounted.

FIGS. 4A to 4E do not show the trigger 11, its axle 17, or the pedal 16, but the actuator 14 which is fixed to the pedal 16, as shown by FIGS. 3A and 3B.

Figure 4A:
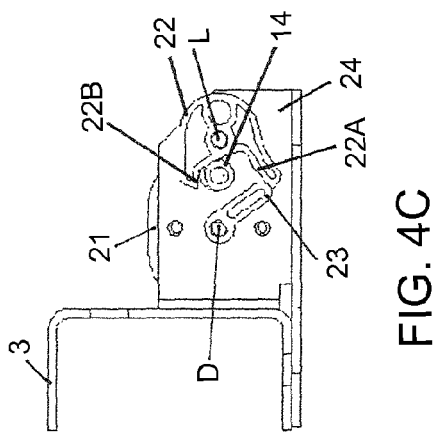
FIGS. 4A to 4E are diagrammatic side-views on a delayer and an actuator in different positions.

FIG. 4A shows the pivoting lock 22 in its release position, its U opening pointing towards the actuator 14. The pivoting lock 22 is pivotable about a lock axle L.

The lock axle L is arranged substantially horizontally. While no other external force is effecting the pivoting lock 22, its heavier side arranged opposite of the opening will try to pivot downwards caused by gravitation. This causes the opening of the pivoting lock 22 to point upwards towards the actuator 14, enabling a possible engaging of the actuator 14 into the opening. In this release position of the pivoting lock 22, the pivoting caused by gravitation is limited by one of the flanks of the U-shaped pivoting lock 22, the abutment flank 22A.

Figure 4B:
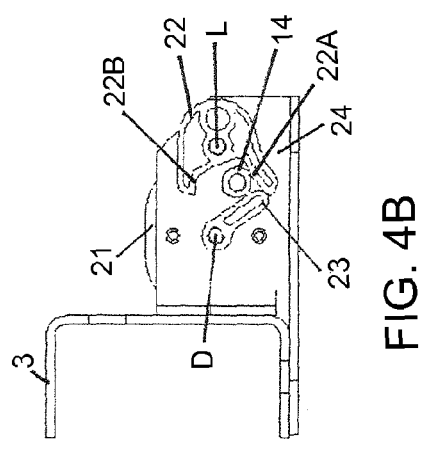

When the trigger 11 is triggered, the actuator 14 moves inside the opening of the pivoting lock 22, thus, pushing the tip of the pointer 23 downwards, rotating the pointer 23 around its axle D. FIG. 4B shows the release mechanism while a load is pressing the trigger 11 down, which also means that actuator 14 is pressed down into the U-shaped opening of the pivoting lock 22.

By pivoting the top of the pointer 23 downwards, it is circularly moved about the drive axle D of the rotary drive of the clockwork 21. Therefore, the clockwork 21 gets wound up by the actuator 14 when the trigger 11 is triggered.

Another effect of the downwards movement of the actuator 14 is that the pivoting lock 11 is pivoted around its lock axle L. This is accomplished by pressing down the pointer 23, which pushes down the lower flank of the U-shaped pivoting lock, the abutment flank 22A. In the release position of FIG. 4A, the pointer 23 is located between the actuator 14 and the abutment flank 22A of the pivoting lock 22.

So when a pallet arrives on the trigger 11, the pointer 23 is set to its starting point as is the pivoting lock 22.

The lock axle L is arranged substantially parallel to the drive axle D to enable an effective power transmission from the rotary drive to the release mechanism.

FIG. 4B shows the other flank of the U-shaped pivoting lock 22, the locking flank 22B arranged opposite of the abutment flank 22A, located between the actuator 14 and its resting position, (its resting position is shown by FIG. 4A).

Figure 4C:
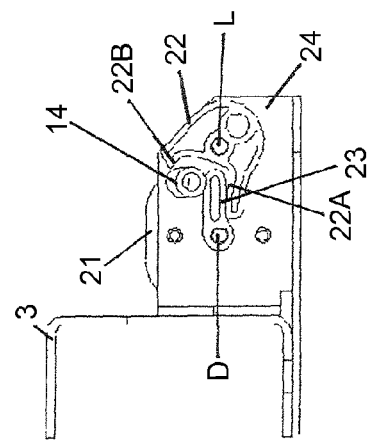

Thus, as shown in FIG. 4C, when the load is lifted from the trigger 11, the actuator 14 tries to move back into its resting position. The actuators' way back is blocked by the locking flank 22B of the pivoting lock 22. FIG. 4C shows the pivoting lock 22 in its locking position, in that it locks the actuator 14 inside its U-shaped opening and therefore blocks the trigger 11 and the separator stop 12 from moving back into the conveying position.

A force trying to move the actuator 14 away from or out of the pivoting lock 22 is caused by a spring 15, as shown in FIG. 3B. The spring 15 is used to gain elastic energy when the trigger is triggered and to release this elastic energy to move back both the trigger 11 and the stop 12 into the active conveying position.

Figure 4D:
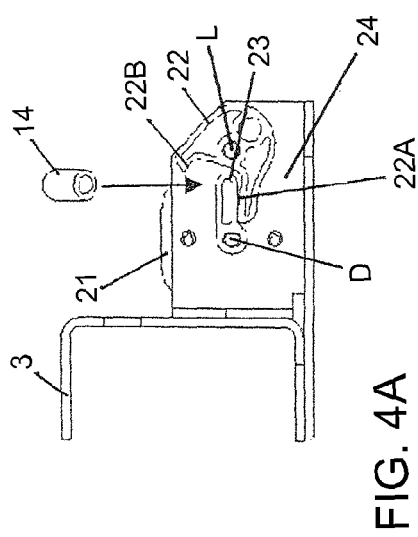
Figure 4E:
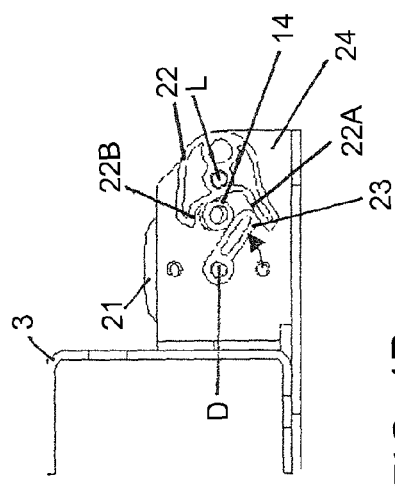

As soon as the load is lifted from the trigger 11, and the actuator 14 tries to get back into its resting position, the pressure from the actuator 14 on the pointer 23 is lifted. That starts the clockwork 21 to run. Clockwork 21 is pivotally moving the pointer 23 back towards the position it has in FIG. 4A. The moving direction is indicated in FIG. 4D by an arrow. While the clockwork 21 is driving the pointer 23 around the drive axle D, the pivoting lock 22 stays in locking position. In the locking position of the pivoting lock 22, the locking flank 22B is locking the actuator 14 by holding it in the U-shaped opening of the pivoting lock 22.

The tip of the pointer 23 is touching the abutment flank 22A of the pivoting lock 22 while the clockwork 21 drives the pointer 23. Thus, the tip of the pointer 23 holds the pivoting lock 22 in its locking position. The spring means 15 pushing actuator 14 back into its resting position delivers a pressure on the locking flank 22B of the pivoting lock 22 trying to pivot the pivoting lock 22 back into its release position (the position shown in FIG. 4A). This moment of the pivoting lock 22 causes a pressure on the abutment flank 22A against the tip of the pointer 23. This force is applied from the tip of the pointer 23 towards the driver axle D. So, while the pressure of the actuator 14 causes a moment on the pivoting lock 22, substantially no moment is caused by it on the pointer 23 about the driving axle D. Thus, the clockwork 21 can drive the pointer 23 without a force of the actuator 14 winding up or down the clockwork 21.

Thus, a decoupling of the spring force moving actuator 14 from the rotary drive of the clockwork 21 is accomplished. For this the abutment flank 22A of the U-shaped pivoting lock 22 is arranged bending outwards of the U-shape with its tip.

After the time of the clockwork 21 is spent, the pointer 23 reaches a resting position in which no or nearly no pressure from the rotary drive affects the pointer 23. The position of the pointer 23 shown in FIG. 4E corresponds with its position in FIG. 4A. In this position the tip of the pointer 23 was moved all along the inner side of the abutment flank 22A towards the base of the U-shaped opening of the pivoting lock 22. In this position the pointer 23 stops holding back the abutment flank 22A in the locking position. The pressure of the actuator 14 pressing against the locking flank 22B causes the pivoting lock 22 to pivot around the locking axle L into its release position. In the situation shown in FIG. 4E, the pivoting lock 22 has just switched back into its release position releasing the actuator 14 in that the locking flank 22B has moved out of the way of the actuator 14 towards its resting position (the position shown in FIG. 4A). The actuator 14 can therefore switch into its resting position, allowing the pedal 16 (shown in FIGS. 3A and 3B) to release its grip on the axle 17 of the trigger 11, thus releasing both the trigger 11 into its triggering position and by means of the coupling 13 also releasing stop 12 into its conveying position.

The pivoting lock 22 releases the actuator 14 and therefore the trigger 11 when the pointer 23 has turned for a given angle from its starting point. For a given angle, the pointer 23 receives no torque from the trigger 11 or from the pivoting lock 22, since that force is directed from the top of the pointer 23 towards its drive axle D. After the pointer 23 was driven by the rotary drive for a given angle, the pivoting lock 22 drives the pointer 23 to its end point and both the pointer 23 and the pivoting lock 22 reach their end point, releasing both trigger 11 and stop 12.

Depending on the angle of the pointer 23, the pointer 23 can reach an angular position at which most of the time of the clockwork 21 has run up (which means most of the energy stored in the energy storage is spent) and at which the pressure originating from the spring 15 (transferred via the abutment flank 22A) pushes the pointer 23 to its end point. This happens when the line of force caused by the pressure of the abutment flank 22A on the top of the pointer 23 is arranged under a certain angle towards the driving axle D. The amount of energy in the energy storage gained by winding up the clockwork 21 is then mostly spent, so that less than 30% (or in some embodiments less than 10%) of it is left.

What is claimed is:

1. A separator device for a conveyor, comprising:
a stop (12) arranged to be moved between a separating position and a conveying position,
a trigger (11) arranged to move the stop (12) into the separating position when triggered, and
a delayer (20) arranged to delay a movement of the stop (12) from the separating position into the conveying position,
characterised in that
the delayer (20) comprises an energy storage arranged to gain energy when the trigger (11) is triggered, wherein
the energy storage is arranged to power a rotary drive impeding the stop (12) from moving into the conveying position, and
the delayer (20) comprises a pointer (23) driven by the rotary drive so that the rotary drive drives the angular position of the pointer (23).

2. The separator device of claim 1, wherein the delayer (20) comprises a restrainer delaying a decrease of the energy in the energy storage to elongate a time span during which the rotary drive is powered by the energy storage.

3. The separator device of claim 2, wherein the restrainer is an escapement of a clockwork (21).

4. The separator device of claim 1, wherein at least one of the trigger (11) and the stop (12) comprises an actuator (14) delivering the energy to the energy storage when the trigger (11) is triggered by winding up the energy storage powering the rotary drive.

5. The separator device of claim 1, comprising a release mechanism with a pivoting lock (22) arranged to switch from a locking position in which the pivoting lock (22) impedes the stop (12) into a release position in which the pivoting lock (22) releases the stop (12) into the conveying position.

6. The separator device of claim 5, wherein the pivoting lock (12) is arranged to switch from the locking position into the release position when the energy stored in the energy storage is decreased to less than 30% of the amount gained when triggered by the trigger (11).

7. The separator device of claim 4, wherein the release mechanism comprises an opening, the opening being arranged to accommodate the actuator (14) when the trigger (11) is triggered and to hold the actuator (14) engaged to the release mechanism for restraining the stop (12) from moving into the conveying position.

8. The separator device of claim 7, wherein the pivoting lock (22) comprises the opening to accommodate the actuator (14), and wherein the actuator (14) is arranged to engage into the opening of the pivoting lock (22).

9. The separator device of claim 5, wherein the actuator (14) is arranged to switch the pivoting lock (22) into the locking position when the trigger (11) is triggered.

10. The separator device of claim 1, wherein the pointer (23) is arranged to transmit a force to the pivoting lock (22) to switch or to allow a switching of the pivoting lock (22) into the release position or into the locking position depending on the angular position of the pointer (23).

11. The separator device of claim 1, wherein the pointer (23) is engaging into the opening of the release mechanism to accommodate the actuator (14) for the transmission of a force to the pivoting lock (22).

12. The separator device of claim 1, comprising a spring (15) to deliver a force moving the stop (12) into the conveying position when not impeded by the delayer (20).

13. The separator device of claim 12, wherein the force of the spring (15) is decoupled from the rotary drive.

14. A conveyor for conveying goods, the conveyor comprising a separator device that includes:
a stop (12) arranged to be moved between a separating position and a conveying position,
a trigger (11) arranged to move the stop (12) into the separating position when triggered, and
a delayer (20) arranged to delay a movement of the stop (12) from the separating position into the conveying position,
characterised in that
the delayer (20) comprises an energy storage arranged to gain energy when the trigger (11) is triggered, wherein
the energy storage is arranged to power a rotary drive impeding the stop (12) from moving into the conveying position,
the delayer (20) comprises a pointer (23) driven by the rotary drive so that the rotary drive drives the angular position of the pointer (23), and
the stop (12) of the separator device (10) is arranged to stop goods from being conveyed when the stop (12) is in the separating position.

15. The conveyor of claim 14, wherein the stop (12) and the trigger (11) are rotatable about substantially parallel rotational axes, and wherein the rotary drive defines a rotational axis substantially parallel to the rotational axes of the stop (12) and the trigger (11).

16. The separator device of claim 1, wherein the stop (12) and the trigger (11) are rotatable about substantially parallel rotational axes, and wherein the rotary drive defines a rotational axis substantially parallel to the rotational axes of the stop (12) and the trigger (11).

* * * * *